US012624185B2

(12) United States Patent
Balan et al.

(10) Patent No.: US 12,624,185 B2
(45) **Date of Patent: *May 12, 2026**

(54) RECYCLING METHOD FOR ELASTOMER TOUGHENED THERMOPLASTIC POLYMERS

(71) Applicant: TRINSEO EUROPE GMBH, Pfaeffikon (CH)

(72) Inventors: Abidin Balan, Breda (NL); Gilbert Bouquet, Ghent (BE); Elroy Eekman, Terneuzen (NL); Pascal Lakeman, Breda (NL)

(73) Assignee: TRINSEO EUROPE GMBH, Pfaeffikon (CH)

( * ) Notice: Subject to any disclaimer, the term of this patent is extended or adjusted under 35 U.S.C. 154(b) by 35 days.

This patent is subject to a terminal disclaimer.

(21) Appl. No.: 18/742,053

(22) Filed: Jun. 13, 2024

(65) Prior Publication Data

US 2024/0327599 A1 Oct. 3, 2024

Related U.S. Application Data

(63) Continuation of application No. 18/269,100, filed as application No. PCT/EP2021/085220 on Dec. 10, 2021, now Pat. No. 12,024,600.

(30) Foreign Application Priority Data

Dec. 28, 2020 (EP) .................................... 20217398

(51) Int. Cl.
*C08J 11/08* (2006.01)

(52) U.S. Cl.
CPC ........... *C08J 11/08* (2013.01); *C08J 2300/22* (2013.01); *C08J 2400/26* (2013.01)

(58) Field of Classification Search
USPC ........................................................... 521/40
See application file for complete search history.

(56) References Cited

U.S. PATENT DOCUMENTS

| | | | |
|---|---|---|---|
| 4,031,039 | A | 6/1977 | Mizumoto et al. |
| 4,572,819 | A | 2/1986 | Priddy et al. |
| 4,585,825 | A | 4/1986 | Wesselmann |
| 4,666,987 | A | 5/1987 | Burmester et al. |
| 5,233,021 | A | 8/1993 | Sikorski |
| 5,278,282 | A | 1/1994 | Nauman et al. |
| 6,051,650 | A | 4/2000 | Endo et al. |
| 6,329,436 | B1 | 12/2001 | Jody et al. |
| 8,138,232 | B2 | 3/2012 | Maeurer et al. |
| 8,338,563 | B2 | 12/2012 | Vandenhende |
| 9,416,269 | B2 | 8/2016 | Kulkarni et al. |
| 2003/0191202 | A1 | 10/2003 | Maurer et al. |
| 2004/0138378 | A1 | 7/2004 | Takagi |
| 2009/0124715 | A1 | 5/2009 | Vandenhende |
| 2014/0200302 | A1 | 7/2014 | Kulkarni et al. |
| 2017/0022346 | A1 | 1/2017 | Weeden, Jr. et al. |

FOREIGN PATENT DOCUMENTS

| | | | | |
|---|---|---|---|---|
| CA | 2610576 | A1 | 12/2006 | |
| CN | 101928405 | A | 12/2010 | |
| CN | 103159979 | A | 6/2013 | |
| CN | 103694491 | A | 4/2014 | |
| CN | 103709436 | A | 4/2014 | |
| CN | 104937033 | A | 9/2015 | |
| CN | 105255096 | A | 1/2016 | |
| GB | 1110008 | A | 4/1968 | |
| JP | H06335641 | A * | 12/1994 | ............ B01D 61/18 |
| JP | 2000280245 | A * | 10/2000 | |
| JP | 2002264129 | A | 9/2002 | |
| JP | 2003231119 | A | 8/2003 | |
| JP | 2004323825 | A | 11/2004 | |
| WO | 2001072900 | A1 | 10/2001 | |
| WO | 2003086733 | A1 | 10/2003 | |
| WO | WO-2004013204 | A2 * | 2/2004 | ............ C08G 63/89 |
| WO | 2005026244 | A1 | 3/2005 | |
| WO | 2006030020 | A1 | 3/2006 | |
| WO | 2007014907 | A1 | 2/2007 | |

(Continued)

OTHER PUBLICATIONS

Dissolution study of BAMO/AMMO thermoplastic elastomer for the recycling and recovery of energetic materials by Zhihua Cao et al. ; Journal of Energetic Materials, vol. 15, 1997—Issue 2-3, Chemical Sciences and Engineering Dept, Highly Filled Materials Institute; Stevens Institute of Technolog (Year: 1997).*
JP-H06335641-A machine translation (Year: 2004).*
JP-2000280245-A machine translation (Year: 2000).*
Aggadi et al., "Removal olf Reactive Blue 21 (RB21) Phthalocyanine Dye from Aqueous Solution by Adsorption Process: a Review." Pol. J. Environ. Stud. vol. 30, No. 4 (2021), 3425-3432.
Arends, D. et al., "Removal of inorganic colour pigments from acrylonitrile butadiene styrene by dissolution-based recycling." J Mater Cycles Waste Manag 15 2012 85-93 DOI 10.1007/s10163-012-0041-5.
Arostegui, A. et al., "Effect of dissolution-based recycling on the degradation and the mechanical properties of acrylonitrile-butadiene-styrene copolymer." Polymer Degradation and Stability 91. 2006 2768-2774 doi: 10.1016/j.polymdegradstab.2006.03.019.

(Continued)

*Primary Examiner* — Terressa Boykin
(74) *Attorney, Agent, or Firm* — Young Basile Hanlon & MacFarlane, P.C.

(57) ABSTRACT

Toughened thermoplastic polymers having elastomeric domains in thermoplastic polymer may be recycled by a method comprising dissolving the thermoplastic polymer in a solvent to form a solution, wherein the elastomer is dispersed within the solution as elastomer particulates or droplets, applying a sufficient centrifugal force to the solution to separate the elastomeric particulates or droplets from the solution to form a separated system and (c) recovering the thermoplastic polymer and elastomeric polymer by removing one or both from the separated system. The recovered elastomer and thermoplastic polymer may then be reused in the same type, similar or differing plastics avoiding degradation typically found when recycling toughened thermoplastic polymers.

20 Claims, No Drawings

(56) References Cited

FOREIGN PATENT DOCUMENTS

| | | | |
|---|---|---|---|
| WO | 2014110455 | A1 | 7/2014 |
| WO | 2015076868 | A1 | 5/2015 |
| WO | 2016049782 | A1 | 4/2016 |
| WO | 2020082184 | A1 | 4/2020 |
| WO | 2021110751 | A1 | 6/2021 |

OTHER PUBLICATIONS

Chandrasekaran, S. et al., "Materials and Energy Recover from E-Waste Plastics." ACS Sustainable Chem. Eng. 2018, 6, 4594-4602.
Cigna, G., "Dynamic Mechanical Properties, Structure, and Composition of Impact Polystyrene", Journal of Applied Polymer Science, vol. 14, pp. 1781-1793 (1970) (13 pages).
Communication pursuant to Rule 114(2) EPC in co-pending Application No. EP21834801.9 dated Jul. 24, 2023 . . . (PCT Third Party Observation) 22 pages.
Extended European Search Report issued in co-pending Application EP20217398 dated Jul. 16, 2021 (6 pages).
Gesner, B.D., "Phase Separation of Some Acrylonitrile-Butadiene-Styrene Resins", Journal of Polymer Science: part A, vol. 3, pp. 3825-3831 (1965) (7 pages).
International Search Report and Written Opinion issued in co-pending Application No. PCT/EP2021/085220 mailed Jun. 2, 2022; 10 pages.
Leal, G. Patricia et al., "Evolution of the morphology of HIPS particles", Institute for Polymer Materials, Polymer 50 (2009) 68-76 (9 pages).
Majekodunmi, Stephen Olaribigbe, "A Review on Centrifugation in the Pharmaceutical Industry." American Journal of Biomedical Engineering 2015, 5(2): 67-78. DOI: 10.5923/j.ajbe.20150502.03.
Miller-Chou, B. et al., "A review of polymer dissolution." Progress in Polymer Science 28 (2003) 1223-1270.
Schlummer, M. et al., "Recycling of flame-retarded plastics from waste electric and electronic equipment." (WEEE). Waste Manage Res 2006: 24: 573-583. DOI: 10.1177/0734242X06068520.
Schlummer, Martin et al., "Report: Recycling of flame-retarded plastics from waste electric and electronic equipment (WEEE)", Waste Management & Research 2006; 24; 573 (11 pages).
Search Report issued in co-pending Application No. TW110148276 dated Dec. 1, 2022, with English translation (2 pages).
Senthil, T. et al., "Effect of Solvents on the Solution Electrospinning of Poly(styrene-co-acrylonitrile)." KGK-07-8 2017. www.kgk-rubberpoint.de <http://www.kgk-rubberpoint.de>.
Turner, R.R. et al., "Determination of Ungrafted Rubber in ABS Polymers", J. of Elastomers and Plastics, vol. 6 (Apr. 1974), pp. 94-102 (9 pages).
Weeden, Jr., G. et al., "Method for Efficient Recovery of High-Purity Polycarbonates from Electronic Waste." ACS Publications 2015 American Chemical Society. DOI: 10.1021/es5055786.
Zhao, Y. et al., "Laboratory simulations of the mixed solvent extraction recovery of dominate polymers in electronic waste." Waste Management 69 (2017) 393-399.
Zhao, Y., "Solvent-based separation and recycling of waste plastics: A review." Chemosphere 209 (2018) 707-720.
Cao et al.,"Dissolution Study of BAMO/AMMO Thermoplastic Elastomer for the Recycling and Recovery of Energetic Materials", Journal of Energetic Materials, vol. 15, Issue2-3, Chemical Sciences and Engineering Department and Highly Filled Materials Institute, 1997. (35 pages).
Ullmann "Ullmann's Encyclopedia of Industrial Chemistry" Wiley-VCH Verlag Gmbh & Co. KGaA 2011 Ed. 7th vol. 29 p. 486-522.
Niessner Norbert "Practical Guide to Structures, Properties and Applications of Styrenic Polymers" Smithers Rapra Technology Ltd. 2013 p. 9; 54; 55.
Niessner Norbert "Recycling of Plastics" Carl Hanser Verlag 2022 p. 247-273.
Krell Erich et al "Einführung in die Trennverfahren" VEB Deutscher Verlag für Grundstoffindustrie 1095 p. 137-179; p. 299-313.
Moore L.D. et al "Molecular structure analysis of graft polymers" Applied Polymer Symposia, vol. 7 1968 p. 67-80.
Hornby A.S. "Oxford Advanced Learner's Dictionary" Oxford University Press 1995 p. 934.
Centrifuge—speed chart 2012 (Thermo Scientific).
ABS/EP Division 2012 Diary.
Datasheet Table Top Centrifuge (Biobase).

* cited by examiner

RECYCLING METHOD FOR ELASTOMER TOUGHENED THERMOPLASTIC POLYMERS

CROSS-REFERENCE TO RELATED APPLICATIONS

This application is a continuation of U.S. patent application Ser. No. 18/269,100 filed Jun. 22, 2023, which is a National Stage 371 entry of International Application No. PCT/EP2021/085220, filed on Dec. 10, 2021, published as WO2022/144158, which claims priority from European Patent Application No. 20217398.5, filed on Dec. 28, 2020, the entire disclosures of which are hereby incorporated by reference.

TECHNICAL FIELD

The invention relates to recycling of thermoplastic polymers toughened with elastomer domains/particulates. In particular, the invention relates to the recycling and separation of elastomers from elastomer toughened thermoplastics such as high impact polystyrene (HIPS) and acrylonitrile butadiene styrene (ABS) polymers.

BACKGROUND

The recycling of thermoplastic polymers has generally been accomplished by mechanically pulverizing and incorporating into a composite or by dissolution and physical separation of insoluble materials (e.g., fillers, insoluble polymers, pigments and the like). Examples of such recycling include selective polymer dissolution in solvents and super critical fluids with or without the application of heat and removal of insoluble particles, including polymer precipitates by filtration or other means such as centrifugal decanting such as described in the following patents and patent publications: U.S. Pat. Nos. 5,233,021, 5,278,282, 8,138,232, 8,338,563, US20030191202, WO2001072900, WO2005026244 and WO2015076868.

Thermoplastic polymers toughened with elastomeric domains/particles (e.g., HIPS and ABS) are widely used for their impact strength and chemical resistance in a wide array of devices such as appliances (e.g., refrigerators) and electronic devices (e.g., televisions and computers). It is known that recycling of these type of plastics is problematic, because the recycled plastics fail to achieve the same properties and introduce substantial variability even when mixed with virgin polymers such as described by Japanese Application publications: JP2003231119 and JP2004323825A.

Accordingly, it would be desirable to provide an improved recycling method allowing greater use of thermoplastic polymers toughened with elastomeric domain/particles such as HIPS and ABS polymers.

SUMMARY

Applicants have surprisingly discovered that in certain toughened thermoplastic polymers having elastomeric domains/particles dispersed therein such as ABS or HIPS polymer may be selectively dissolved and the thermoplastic polymer may be substantially separated from the elastomer. This enables the use of the separate use of each of these in subsequent applications like the original application by blending with other components (e.g., virgin polymer or virgin rubber particles) reconstituting the characteristics of the recycled polymer. Alternatively, the recycled polymer may be used in other applications not requiring the same characteristics (e.g., applications of polystyrene "PS" or styrene-acrylonitrile "SAN" type polymers) where the recycled material may be used to enhance the properties due to the presence of a small amount of elastomer within the recycled PS or SAN.

A first aspect of the invention is a method of recycling a toughened thermoplastic polymer having therein an elastomeric polymer that is present as dispersed elastomer domains comprising, (a) dissolving the thermoplastic polymer in a solvent to form a solution, wherein the elastomer is dispersed within the solution as elastomer particulates or droplets, the solution and elastomer particles or droplets each having a density such that said densities have a density difference;

(b) applying a centrifugal force to the solution to separate the elastomeric particulates or droplets from the solution to form a separated system, (c) recovering the thermoplastic polymer and elastomeric polymer by removing one or both from the separated system.

A second aspect of the invention is a thermoplastic polymer comprised of a virgin thermoplastic polymer blended with the recovered thermoplastic polymer of the first aspect. In this aspect, a thermoplastic polymer of virgin monomers is blended, for example, by melt blending with the recovered thermoplastic polymer (e.g., make an SAN thermoplastic polymer).

A third aspect of the invention is an impact modified thermoplastic polymer comprising the recovered thermoplastic polymer of the first aspect and a virgin impact modifier dispersed therein. In this aspect it has been discovered that the recovered thermoplastic polymer may be compounded in the same fashion as virgin thermoplastic polymer to realize an impact modified thermoplastic polymer having essentially the same characteristics and properties as such polymers made with virgin thermoplastic polymer.

A fourth aspect of the invention is an impact modified thermoplastic polymer comprising a thermoplastic polymer blended with the recovered elastomer of the first aspect. In an embodiment of this aspect, the elastomer containing insoluble higher density components (e.g., fillers and the like) of the toughened thermoplastic polymer that has been separated may be used for applications that demand some toughness improvement, but not to the extent virgin elastomer provides when blending with thermoplastic polymers.

DETAILED DESCRIPTION

The method is comprised of dissolving the thermoplastic polymer of a thermoplastic polymer toughened by elastomeric domains/particles. The thermoplastic polymers toughened with elastomeric domains/particles ("toughened thermoplastic polymers") are comprised of a vinyl aromatic monomer polymerized in the presence of a polymerized conjugated diene (elastomer) dissolved in the aromatic vinyl monomer and any solvent used to polymerized the aromatic vinyl monomer and comonomer. The vinyl aromatic monomer typically is a monomer of the formula:

$$Ar—C(R^1)=C(R^1)_2$$

wherein each $R^1$ is independently in each occurrence hydrogen or alkyl or forms a ring with another $R^1$, Ar is phenyl, halophenyl, alkylphenyl, alkylhalophenyl, naphthyl, pyridinyl, or anthracenyl, wherein any alkyl group contains 1 to 6 carbon atoms which may optionally be mono or multi-substituted with functional groups. Such as halo, nitro, amino, hydroxy, cyano, carbonyl and carboxyl. Typically, the vinyl aromatic monomer has less than or equal 20 carbons and a single vinyl group. In one embodiment, Ar is phenyl or alkyl phenyl, and typically is phenyl. Typical vinyl aromatic monomers include styrene (including conditions whereby syndiotactic polystyrene blocks may be produced), alpha-methylstyrene, all isomers of vinyl toluene, especially para-vinyltoluene, all isomers of ethyl styrene, propyl styrene, butyl styrene, vinyl biphenyl, vinyl naphthalene, vinyl anthracene and mixtures thereof. Typically, the vinyl aromatic monomer is styrene. Further examples of vinyl aromatic monomer include those described in U.S. Pat. Nos. 4,666,987; 4,572,819 and 4,585,825, which are herein incorporated by reference.

The vinyl aromatic monomers may be copolymerized with other addition polymerizable monomers such as unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The copolymers may contain an unsaturated nitrile in an amount greater than 0.1 percent by weight of the copolymers or greater, about 1 percent by weight or greater or about 2 percent by weight or greater. The copolymers may contain one or more unsaturated nitriles in an amount of about 40 percent by weight of the copolymers or less, about 35 percent by weight or less, about 30 percent by weight or less or about 20 percent by weight or less.

The elastomer domains within the thermoplastic polymer may be any elastomeric polymer that phase separates into domains when forming the toughened thermoplastic polymer. Surprisingly in an embodiment, the elastomer may be cross-linked, grafted with the thermoplastic polymer, or occluded within thermoplastic polymer and still be separated. The cross-linking may arise from cross-linking within and between the chains of the conjugated diene, or cross-links arising between chains of polybutadiene and the thermoplastic polymer or combination thereof. When the elastomer is cross-linked sufficiently, the domains when dissolved remain as particles though they may undergo some swelling due solvation of the solvent. Nevertheless, the particles may be subject to the centrifugal force and separated.

In another embodiment, the polymer may have insufficient cross-linking (e.g., be a linear elastomer polymer) that may phase separate in the solvent to form droplets that are then able to be separated by the method described herein. This again may be accomplished even though the elastomer may have been grafted or occluded within the thermoplastic polymer.

Illustratively, the elastomer may be a polymerized conjugated alkene (e.g., diene) that forms the elastomer domains or particles within the thermoplastic polymer and may be any suitable to toughen the thermoplastic polymer. Generally, the conjugated alkene monomer is of the formula:

$$R_2C{=}CR{-}CR{=}CR_2$$

wherein each R, independently each occurrence, is hydrogen or alkyl of one to four carbons, where any two R groups may form a ring. Desirably the conjugated alkene is a conjugated diene monomer having at least 4 carbons and no more than about 20 carbons. The conjugated alkene monomer may have 2 or more conjugated double bonds. Examples include, 1,3-butadiene (butadiene), 2-methyl-1,3-butadiene (isoprene), 2-methyl-1,3 pentadiene, and similar compounds, and mixtures thereof. Desirably, the monomer is butadiene, isoprene or combination thereof.

The elastomer may be any thermoplastic elastomer (TPE) known in the art that phase separates during the formation of the toughened thermoplastic elastomer. Illustratively, the TPE may be a block copolymer comprised of at least two distinct blocks of a polymerized vinyl aromatic monomer and at least one block of a polymerized conjugated alkene monomer. wherein each block copolymer has at least two blocks of a vinyl aromatic monomer having up to 20 carbon atoms as previously described herein and a conjugated diene also previously described herein. The block copolymer can contain more than one specific polymerized conjugated alkene monomer. In other words, the block copolymer can contain, for example, a polymethylpentadiene block and a polyisoprene block or mixed block(s). In general, block copolymers contain long stretches of two or more monomeric units linked together. Suitable block copolymers typically have an amount of conjugated alkene monomer unit block to vinyl aromatic monomer unit block of from about 30:70 to about 95:5, 40:60 to about 90:10 or 50:50 to 65:35, based on the total weight of the conjugated alkene monomer unit and vinyl aromatic monomer unit blocks. The block copolymer TPE can contain more than one polymerized vinyl aromatic monomer. In other words, the block copolymer may contain a pure polystyrene block and a pure poly-alpha-methylstyrene block or any block may be made up of mixture of such monomers. Desirably, the A block is comprised of styrene and the B block is comprised of butadiene, isoprene or mixture thereof. In an embodiment, the double bonds remaining from the conjugated diene monomer may be hydrogenated.

Examples of such TPEs may include styrene-(butadiene)-styrene (SBS), styrene-(ethylene-butylene)-styrene (SEBS) or combination thereof. In an embodiment, the STPE is comprised of SEBS wherein essentially all of the unsaturated bonds of the source SBS have been hydrogenated. Such TPEs are commonly available under tradenames such as SEPTON and HYBRAR from Kuraray, (Houston, TX). STPEs that may be suitable are also available from Audia Elastomers (Washington, PA) under their trade designation TPE. Other suitable STPEs may include those available from Dynasol under the tradename CALPRENE, STPEs from Kraton Corporation (Houston, TX) under the KRATON F and G tradenames, Mexpolimeros (Mexico), and Asahi Kasei Corporation (Japan) under tradenames ASAPRENE and TUFPRENE.

The elastomer may also be a core shell rubber. The core shell rubber is comprised of particles having a core of elastomeric material and a shell of a protective material. Typically, the core is comprised of an elastomer having a low Tg to realize the toughening of the toughened thermoplastic polymer such as about 0° C. or less, about −25° C. or less, or about-40° C. or less. Exemplary core materials include polymers of siloxanes, silicones, ethylene, propylene, butadiene, acrylates, methacrylates and the like.

The shell is a relatively rigid polymer and may contain reactive groups that react with the polyester. Exemplary reactive groups on the surface of the shell of the core shell rubber may include glycidyl, maleic anhydride, and the like. The shell may further comprise polymer chains derived from one or more monomers that form rigid polymer chains. Any monomers which form rigid polymer chains may be utilized. The monomers may polymer-ize by free radical polymerization. The monomers may be capable of polymerizing in emulsion polymerization processes. Exemplary classes monomers are alkyl (meth)acrylates, styrenics, acrylonitriles, and the like. Exemplary alkyl (meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate may be preferred. The shell may be prepared from alkyl (meth)acrylates, crosslinkers and graft-active monomer units. Multifunctional compounds may be used as crosslinkers. Examples include ethylene glycol dimethacrylate, propylene glycol dimethacrylate, 1,3-butylene glycol dimethacrylate and 1,4-butylene glycol dimethacrylate. The following compounds individually or in mixtures may be used for inserting graft-active sites: allyl methacrylate, triallyl cyan-urate, triallyl isocyanurate, allyl methacrylate. Allyl methacrylate may also act as cross-linker. These compounds may be used in amounts of about 0.1 to about 20 percent, based on the weight of core shell rubber. The preferred graft shell includes one or more (meth)acrylic acid (C1-C8)-alkyl esters, especially methyl methacrylate copolymerized with glycidyl (meth)acrylate.

The core may have grafting sites on its outer surface to facilitate bonding of the shell to the core. The core is a particle having a sufficient size to positively impact the impact properties and the environmental stress crack resistance of the composition of the invention. The particles size may be a median particle size (d50 value) of about 0.05 microns or greater or about 0.1 microns or greater. The particles size may be a median particle size (d50 value) of about 5.0 microns or less, about 2.0 microns of less or about. 1.0 micron or less. The weight ratio of the core to the shell may be any as typically used in the art such as from about 1:99 or greater, about 2:98 or greater or about 3:97 or greater. The weight ratio of the core to the shell may be about 95:5 or less, about 90:10 or less or about 80:20 or less.

The amount of elastomer in the toughed thermoplastic polymer may be any amount such as commonly used in the art to make such polymers. Illustratively, when the toughened thermoplastic polymer is an ABS or HIPS, the amount of the conjugated alkene (e.g., butadiene) typically ranges from about 1%, or 5% to about 40%, 35% or 30% by weight of the ABS or HIPS polymer (i.e., not including any other additives such as fillers and the like). Typically, the particle size/domain size of the elastomers within the thermoplastic polymer is from about 0.1 micrometers to about 10 micrometers equivalent spherical diameter, which may be determined by known micrographic techniques. Such levels of elastomer may of course apply to any elastomer used to form the toughened thermoplastic polymer.

The toughened thermoplastic polymers may contain further additives commonly used in such polymers. Exemplary additives include ignition resistant additives, stabilizers, colorants, antioxidants, antistats, silicon oils, flow enhancers, mold releases, etc. Exemplary ignition resistance additives include halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include oxides (CaO and $TiO_2$), talc, clay, wollastonite, mica, glass or a mixture thereof.

If used, such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

These additives may be separated simultaneously in the method of the invention as described herein or separated by other techniques in series or parallel such as those known in the art including, for example, filtration, sedimentation, precipitation, preferential dissolution, flotation or combination thereof. Likewise, it is understood that the toughened thermoplastic polymer may be present in the device to be recycled as a blend with other polymers (blended polymers) such as commonly used in the art (e.g., polycarbonate-ABS or polycarbonate-HIPS blends). Or, the toughened thermoplastic polymer may be present in a device with other polymers such as in laminate, coating, or separate polymeric components (separate polymers) where the dissolving may include the dissolution of the blended polymers and separate polymers, which may be separated by the method herein and as desired further separated from the thermoplastic polymer also in solution by any useful method to do so.

To perform the dissolving any known methods or combination of methods may be employed to facilitate or accelerate the dissolving of the thermoplastic polymer of the toughened thermoplastic polymer. For example, the scrap polymer may be in the form of devices that may be mechanically shredded, crushed, comminuted or disassembled and separated prior to being dissolved or present when dissolving and be simultaneously separated from by any known methods for separation of insoluble or soluble components of such devices. Generally, the size of the toughened thermoplastic may be any that is useful to dissolve in a time to a concentration of solution that is commercially practicable for separation by the method of the invention. Illustratively, the size of the toughed thermoplastic polymer or remnant of the device may be from several millimeters to 10 or 20 centimeters.

The dissolving may be accomplished in a batch or continuous manner by known methods, which may include the use of agitation, heating and the like and may be performed in a closed or open system. Desirably, the system is closed, wherein the solvent is contained and recycled, and the application of heat may be used with minimizing loss of solvent to the atmosphere. The over-pressure may be comprised of an inert gas including but not limited to nitrogen or noble gas. The elevated pressure may be any useful for performing the method and minimizing vapor losses of the solvent. For example, the pressure may be from 1.1, 2, 5 or 10 bar to about 100 bar.

When dissolving, the thermoplastic polymer of the toughened thermoplastic polymer is dissolved in a particular solvent the elastomeric polymer forms particles or droplets that are not miscible in the solution of solvent and are suspended in the solution of the thermoplastic polymer and solvent. It is understood that some elastomeric polymer may be contained in the solution, but that this amount is not substantial. For example, the amount of elastomeric polymer remaining in the recovered thermoplastic polymer from the method is typically at most about 4%, 3%, 2%, 1%, 0.5% or 0.3% or less by weight and the reduction of elastomeric polymer is at least about 80%, 90% or 95% of the amount in the toughened thermoplastic polymer being recycled.

To enable the separation of the elastomeric polymer from the thermoplastic polymer, the solvent-thermoplastic polymer solution has a density that is different than the elastomeric polymer particles/droplets, which may or may not be solvated with the solvent of used to dissolve the thermoplastic polymer. The difference in density is such that upon application of a centrifugal force, the elastomeric polymer is separated from the solvent-thermoplastic polymer solution allowing recovery of the thermoplastic polymer and elastomeric polymer. Generally, this means that the density difference allows for commercially practicable separation at centrifugal forces readily obtained by commercially available centrifuges for separating larger volumes. Typically, the difference in densities is at least about 1%, 2%, 5% or 10%.

In an embodiment, the solvent is one that has a density lower than the density of either the thermoplastic polymer or elastomeric polymer of the toughened thermoplastic polymer. Illustratively, when the toughened thermoplastic polymer is high impact polystyrene (HIPS), the density of the polystyrene is typically about 1.03 g/cc to 0.96 to 1.05 and polybutadiene (commonly used to make HIPS) is about 0.92 g/cc, the density of the solvent used to dissolve the polystyrene is less than about 0.92 g/cc. Typically, the density of the solvent is at least 10%, 15% or 20% lower than the thermoplastic polymer density. Generally, the thermoplastic polymer has a density of about 0.95 to about 1.1 g/cc. Desirably, in this embodiment, the density of the solvent is less than 0.85 or 0.8 g/cc.

It has been discovered that ketones allow for the separation of the elastomeric polymer from the thermoplastic polymer in a toughened thermoplastic polymer. The ketone may be any that dissolves the thermoplastic polymer while segregating the elastomeric polymer as described above. It has been discovered that acetone is particular suitable, to achieve a solvent-thermoplastic polymer solution having sufficient concentration of dissolved thermoplastic polymer yet realize a density difference and viscosity to practicably separate thermoplastic polymer from the elastomeric polymer.

Generally, the concentration of the thermoplastic polymer in the solvent is from about 5% to 25%, 20% or 15% % by weight in the embodiment where the density of the solvent-thermoplastic polymer is less than the density of the elastomeric polymer suspended in the solution and has a suitable viscosity. Desirably, the viscosity of the solvent is as low as possible to facilitate the separation of the elastomeric polymer from the solvent-thermoplastic polymer solution. To facilitate the separation, the solvent has a low viscosity. For example, the viscosity (kinematic) is less than 10, 5, 1, or even 0.5 millipascal·seconds (mPa·s) at ambient conditions (~20° C.). In an embodiment, the viscosity of the solvent-thermoplastic solution viscosity may be lowered by heating during the method or any portion of the method. Typically, the heating is to a temperature below the boiling point of the solvent and in a closed system that may be at elevated pressures previously described. Illustratively, the heating temperature may be from about 25° C. or 30° C. to about 50° C. or 40° C. It is understood that nothing herein precludes the cooling of the solution or any component thereof if desired, but cooling is not necessary. Nevertheless, it is contemplated that the method may be performed at reduced temperatures (e.g., less than about 20° C. to about −40° C., −20° C., or 0° C.). Likewise, it is understood that some cooling may be desired to maintain temperature during the method, for example, to extract frictional heat arising from rotating equipment.

In an embodiment, a separation enhancing agent may be used that improves the efficiency of separating the elastomer from the thermoplastic polymer (e.g., takes less time to separate or more fully separates the elastomer from the thermoplastic polymer). Illustratively, the separation enhancing agent may be a second solvent that causes the elastomeric domains/particles to increase in density. The second solvent may not dissolve the thermoplastic polymer to any great extent and is sufficiently immiscible in the solvent such that it concentrates and/or dissolves or swells the elastomeric domains or particles effectively changing the density of them (typically increasing the density). Generally, the second solvent has a density that is sufficiently greater than the density of the thermoplastic polymer. Illustratively, the density of the second solvent is at least about 1.2 g/cc, 1.3 g/cc, or 1.4 g/cc to 3 g/cc, 2 g/cc or 1.6 g/cc.

The second solvent may be any having the aforementioned density and that are useful for effectively increasing the density of the elastomeric particles or droplets. Exemplary second solvents include halohydrocarbons and in particular those having at most about 3 carbons. In particular, the halohydrocarbon may be a chlorohydrocarbon and in particular a chlorinated alkane such as chloromethane, dichloromethane, trichloromethane, tetrachloromethane or combination thereof. It is understood that halohydrocarbon solvents may include those that are completely substituted with a halogen such as tetrachlomethane (i.e., carbon tetrachloride).

To separate the elastomeric particles or droplets suspended with the solvent-thermoplastic polymer solution a sufficient centrifugal force is applied so that at least about 80% of the amount of elastomer in the toughened thermoplastic polymer is separated in a reasonable time (e.g., ~1 minute to about 30 minutes, 20 minutes, 15 minutes or 10 minutes). Generally, the centrifugal force is at least about 5,000 g, 7500 g, or 10,000 g to 20,000 g, 17,500 g or 15,000 g.

It has also been discovered that the efficiency of separation may be further enhanced by addition of inorganic particulates that are insoluble in the solvent to the thermoplastic polymer, particularly for the thermoplastic polymers having a small elastomer particle size (e.g., emulsion polymerized ABS) with a particle size ranging from about 0.1 micrometers to 2 micrometers with an average size by volume within the aforementioned range. The inorganic particles may be added prior or during the dissolving of the thermoplastic polymer. The inorganic particulates desirably have average size that is larger than the elastomer droplets and typically the inorganic particles are at least 2×, 5× or 10× larger in average size. The amount of inorganic particulates added may be any useful amount. Typically, the amount of the inorganic particulates added is 1% to 10% by weight of the inorganic particulates and thermoplastic polymer. The inorganic particulates may be any useful particulates such as fillers described above. The size of the elastomers may be determined as described above (e.g., measuring micrographically) in the thermoplastic polymer.

The inorganic particulates may likewise be measured micrographically or known light scatter techniques to determine the equivalent spherical diameter by volume.

In an embodiment, other additives that dissolve in the solvent ("soluble additives") may be removed from the solvent by an adsorption column after separating by application of a g-force. Exemplary soluble additive may be flame retardants, light stabilizers (e.g., hindered amines) and colorants. The adsorption column may be any suitable adsorption column such as those known in the art. Typically, the adsorption column is comprised of activated carbon black.

The separated system formed upon application of the centrifugal force may include other insoluble materials that are separated simultaneously as the elastomeric particles or droplets. The insoluble materials or additives may be any of those known in the art such as fillers, fibers, flame retardants and the like that may be recovered by any suitable method such as those known in the art, including, for example screening, filtration and the like.

The centrifugal force may be generated by any suitable rotating equipment such as commercial scale centrifuges/rotational separators. Examples may include a tubular bowl centrifuge, chamber bowl centrifuge, disk stack separator, imperforate basket centrifuge, decanting centrifuge or combinations thereof. The application may be continuous, batch or semi-continuous or combinations thereof. Several centrifuges may also be used in series. For example, a combination of a continuous centrifuge may be combined with batch centrifuge such as a bowl centrifuge where one centrifuge does a rough separation and the second centrifuge does a finer separation.

In an embodiment, a decanting centrifuge is employed where in one stream the elastomer is removed from the decanting centrifuge along with other insoluble material if present and the solvent-thermoplastic polymer solution is decanted in a second stream. The thermoplastic polymer is then recovered from the second stream. Each stream may be subjected to suitable method for separating or modifying any of the components of the stream such as those known in the art (e.g., solvolysis or pyrolysis, or separation as previously described), For example, the thermoplastic is further separated by a suitable method and recovered by a suitable method such as precipitation of the polymer from the solvent and recovery of the polymer by filtration or decanting off of the solvent or removal of the solvent by vaporization or any other known method such as described in any one of U.S. Pat. Nos. 5,233,021, 5,278,282, 8,138,232, 8,338,563, US20030191202, WO2001072900, WO2005026244 and WO2015076868, each incorporated herein by reference. In another embodiment, there may be three streams that comprise the separated system arising from the application of the centrifugal force, the first and second as described above and a third stream comprised of insoluble material. In this embodiment, the decanting centrifuge may be configured to withdraw three streams.

After recovering the thermoplastic polymer and elastomeric polymer each of these may be re-used in the same type of toughened thermoplastic polymer or used in different polymers. In an embodiment, the recovered elastomeric polymer with or without any virgin elastomeric polymer may be dissolved in thermoplastic monomers described herein such as styrene or styrene acrylonitrile and optionally solvent, which are then polymerized by suitable polymerization methods (e.g., bulk or solution polymerization) to form a toughened thermoplastic polymer comprised of elastomeric domains, wherein at least some portion (i.e., at least 10%, 25%, 50%, 75% or 90% by weight) or all of the domains are comprised of recycled elastomeric polymer.

In another embodiment, the recovered elastomer may be blended with a virgin thermoplastic polymer, such as those described herein, for example, by melt blending as is common in the art to form toughened thermoplastic polymers. When reusing the recovered elastomer, the elastomer may be further separated from other components entrained in the recovered elastomer (e.g., fillers and the like) or used with them present, which may be desirable when an improvement in properties is desired, but not to the extent virgin elastomers are required. In an embodiment, the recovered elastomer, with or without other entrained components, may be used to modify the properties of a thermoset polymer (e.g., addition to thermoset resin that is subsequently cured).

In another embodiment, the recovered thermoplastic polymer may be blended with a virgin thermoplastic polymer. Virgin thermoplastic polymer meaning it is a polymer that is not comprised of any recycled or recovered polymer. In this embodiment, the virgin thermoplastic polymer may be comprised of the thermoplastic monomers such as those described above and may be the same as the monomer(s) of the recovered thermoplastic polymer. For example, the recovered thermoplastic polymer may be a styrene-acrylonitrile (SAN) copolymer or polystyrene (PS) with some trace of elastomeric polymer (e.g., polybutadiene or polyisoprene as described above) that is mixed with SAN copolymer or PS as the case may be. Or, the recovered thermoplastic polymer may be blended with differing compatible thermoplastic polymers such as thermoplastic polymers of differing monomers. For example, the recovered thermoplastic polymer may be a SAN copolymer and the virgin polymer may be a PS or SAN of a differing styrene/acrylonitrile ratio or a copolymer of alpha-methylstyrene and methacrylonitrile. The blending may be carried out by any suitable method such as those known in the art including, but not limited, to melt blending and extruding.

In another embodiment, the recovered thermoplastic polymer may be combined with virgin elastomer (e.g., those described herein) in any suitable manner such as those known in the art to make toughened thermoplastic polymers as described herein. Illustratively, the virgin elastomer may be melt blended and compounded with the recovered thermoplastic polymer using an extruder as commonly practiced in the art. The levels of elastomer and dispersion of the elastomer may be any as previously described herein. In this embodiment, it has been surprisingly found that such toughened thermoplastic polymers may have essentially the same properties and characteristics as such toughened thermoplastic polymers made using virgin thermoplastic polymers in the same manner and concentrations.

ILLUSTRATIVE EMBODIMENTS

1. A method of recycling a toughened thermoplastic polymer having therein an elastomeric polymer that is present as dispersed elastomer domains comprising, (a) dissolving the thermoplastic polymer in a solvent to form a solution, wherein the elastomer is dispersed within the solution as elastomer particulates or droplets, the solution and elastomer particles or droplets each having a density such that said densities have a density difference;

(b) applying a sufficient centrifugal force to the solution to separate the elastomeric particulates or droplets from the solution to form a separated system, (c) recovering the thermoplastic polymer and elastomeric polymer by removing one or both from the separated system.

2. The method of embodiment 1, wherein the solvent has a density of at most about 0.8 g/ml.

3. The method of either embodiment 1 or 2, wherein the solvent is a ketone.

4. The method of any one of the preceding embodiments, wherein the solvent is acetone.

5. The method of any one of the preceding embodiments, wherein the toughened thermoplastic polymer having therein elastomeric domains is a vinyl aromatic polymer having therein domains of an elastomer of a conjugated diene.

6. The method of embodiment 5, wherein the toughened thermoplastic polymer having therein elastomeric domains is a high impact polystyrene, acrylonitrile-butadiene-styrene copolymer or combination thereof.

7. The method any one of the preceding embodiments, wherein the centrifugal force is about 5000 g to about 20,000 g.

8. The method of embodiment 7, wherein the centrifugal force is about 10,000 g to about 15,000 g.

9. The method of any one of the preceding embodiments, wherein the density of the thermoplastic polymer is 0.95 g g/cc to 1.1 g/cc.

10. The method of any one of the preceding embodiments further comprising introducing a second solvent that does not dissolve the thermoplastic polymer, but swells or dissolves the elastomeric particles wherein the difference in density increases.

11. The method of embodiment 10, wherein the second solvent has a density of at least 1.2 g/cc.

12 The method of either embodiment 10 or 11, wherein the second solvent has a density of at least 1.4 g/cc.

13. The method of any one of embodiments 10 to 12, wherein the second solvent is a halohydrocarbon.

14. The method of embodiment 13, wherein the halohydrocarbon is a chlorohydrocarbon 15. The method of embodiment 14, wherein the halohydrocarbon has at most 3 carbons.

16. The method of embodiment 15, wherein the halohydrocarbon is a chlorinated alkane that is chloromethane, dichloromethane, trichloromethane, tetrachloromethane or combination thereof.

17. The method of any one of the preceding embodiments, wherein the solvent has a kinematic viscosity of at most about 0.5 mPa·s at ambient temperature.

18. The method of any one of the preceding embodiments further comprising heating or cooling during at least a portion of the method.

19. The method of embodiment 18, wherein the heating is to a heating temperature below the solvent's boiling temperature.

20. The method of embodiment 19, wherein the heating temperature is at most about 40° C.

21. The method of any one of the preceding embodiments wherein the method is performed in a closed system.

22. The method of any one of the preceding embodiments wherein the method is performed under a gas pressure above atmospheric pressure.

23. The method of embodiment 22, wherein the pressure is at least 1.1 bar to about 100 bar.

24. The method of any one of the preceding embodiments, wherein the thermoplastic polymer having therein elastomeric domains is further comprised of insoluble additives that are separated and recovered during the method.

25. The method of any one of the preceding embodiments, wherein the recovered thermoplastic polymer has at most 10% by weight of the elastomeric polymer that was in the thermoplastic polymer.

26. The method of embodiment 25, wherein the recovered thermoplastic polymer has at most about 2% by weight of elastomeric polymer dispersed therein.

27. The method of any one of the preceding embodiments, wherein the density difference is at least about 5%.

28. The method of embodiment 27, wherein the density difference is at least 10%.

29. The method of any one of the preceding embodiments, wherein the centrifugal force is applied by a decanting centrifuge, tubular bowl centrifuge, chamber bowl centrifuge, disk stack separator, imperforate basket centrifuge, or decanting centrifuge.

30. The method of any one of the preceding embodiments, wherein the centrifugal force is applied by a decanting centrifuge.

31. The method of embodiment 30, wherein the separating results in at least two streams with one stream comprised of the thermoplastic polymer in the solution and the other comprised of the elastomer.

32. The method of embodiment 31, further comprising a third stream comprised on other insoluble additives.

33. The method of any one of the preceding embodiments wherein the elastomer that is recovered dissolved in the monomers used to make the toughened thermoplastic polymer and optionally solvent and polymerizing to form new toughened thermoplastic polymer.

34. The method of embodiment 33, wherein the thermoplastic monomer is comprised of a vinyl aromatic monomer, nitrile monomer or combination thereof.

35. The method of embodiment 34, wherein the thermoplastic monomer is comprised of styrene, acrylonitrile or combination thereof.

36. The method of any one of embodiments 1 to 31, wherein the recovered thermoplastic polymer is blended with a virgin plastic.

37. The method of embodiment 36, wherein the virgin plastic is comprised of a vinyl aromatic polymer or copolymer.

38. The method of embodiment 37, wherein the virgin plastic is comprised of polystyrene or styrene-acrylonitrile copolymer.

39. A thermoplastic polymer toughened with elastomer domains wherein at least a portion of the elastomer present during the polymerization of virgin monomers to form the thermoplastic polymer is the recovered elastomeric polymer of any one of the preceding embodiments.

40. The thermoplastic polymer toughened with elastomer domains of embodiment 39, wherein all of the elastomer present during polymerization is the recovered elastomeric polymer.

41. A thermoplastic polymer comprised of thermoplastic polymer of virgin monomer blended with the recovered thermoplastic polymer of any one of the preceding embodiments 1 to 38.

42. The method of embodiment 1, wherein the elastomer is present as particles in the solution.

43. The method of embodiment 42, wherein the elastomer is a polymerized conjugated diene having cross-linking, grafting or combination thereof with the thermoplastic polymer.

44. The method of embodiment 43, wherein the polymerized conjugated diene is polybutadiene, polyisoprene or combination thereof.

45. An impact modified thermoplastic polymer comprised of the recovered thermoplastic polymer of any one of embodiments 1 to 38 having dispersed therein virgin elastomer.

46. The impact modified thermoplastic polymer of embodiment 45, wherein the impact modified thermoplastic polymer is an ABS or HIPS polymer.

EXAMPLES

Example 1

2.25 g of mass polymerized ABS (MAGNUM 3504 available from Trinseo S.A.) is dissolved and dispersed in acetone to a concentration of 15 weight percent and centrifuged at RT at 18000 rpm (~36000×g as calculated from RCF=1.12 Radius×(RPM/1000) for about 2h in 15 ml stainless steel centrifuge tubes using a lab scale centrifuge (Centricon T-124). Phase separation occurs and a rubber phase is adhered to the bottom of the metal tubes. The liquid (solution) is decanted, air dried and the recovered thermoplastic polymer analyzed for its molecular weight and rubber content. 1.50 g (67% recovery with respect to initial mass) thermoplastic polymer is recovered (see Table 1 for “Before” and “After” of the ABS subjected to dissolution and centrifugation) and elastomer was collected from the bottom of the tubes.

Example 2

2.25 g of emulsion polymerized ABS (ABS grade MA221 available from LG Chem) is dissolved and dispersed in acetone to a concentration of 15 weight percent and centrifuged at RT at 18000 rpm for about 2h in 15 ml stainless steel centrifuge in the same manner as Example 1. Phase separation occurs and a rubber phase is adhered to the bottom of the metal tubes. The liquid (solution) was decanted, air dried and the recovered thermoplastic polymer analyzed for its molecular weight and rubber content. 1.50 g (67% recovery with respect to initial mass) thermoplastic polymer was recovered (see Table 1 for composition) and elastomer was collected from the bottom of the tubes.

Examples 3-6 & Comparative Example 1

Example 2 is repeated except that chloroform is added as shown in Table 2 and the concentration of the ABS is 10% by weight in acetone or acetone/chloroform mixture. In Comparative Example 1, the solution is not subject to centrifugal force. From Table 2 it is apparent that the use of chloroform substantially improves the separation of the elastomer (rubber) from the ABS whereas in Comparative Example 1 no separation is observed (elastomer content is the same, see Table 1 “Before”).

Example 7 & Comparative Example 2

1.2 Kg of emulsion polymerized ABS (eABS) used in toy application is dissolved and dispersed in acetone at a concentration of 15% by weight. The SAN phase is separated in the same manner as Example 1. The separated SAN is recovered from the acetone by vacuum evaporation. Grafted rubber concentrate (Korea Kumho Petrochechemical Co. Ltd.) and the same additives (see Table 3) are blended with the recovered SAN by extrusion at the same conditions (ZSK-25 mm extruder, L/D: 42 at 10 kg/hr). Virgin SAN (TYRIL™ SAN, Trinseo) is used as a comparative to make a blended virgin ABS (Comparative Example 2). The characteristics of the recycled eABS (made using recycled SAN and virgin grafted rubber concentrate) of Example 7 and virgin eABS (made using virgin SAN and grafted rubber concentrate) of Comparative Example 2 is shown in Table 4. From the results, it is readily apparent that the recycled eABS Example 7 has comparable properties as the virgin eABS of Comparative Example 2.

Examples 8 and 9

The eABS for Examples 8 and 9 both had a rubber particles having a size between 0.1 micrometer and about 1 micrometer with a peak about 0.2 micrometers as measured by (Light Scattering, Mastersizer-3000, Malvern Panalytical Ltd). Examples 8 and 9 are made in the same as manner as Example 1, except for the following: the g-force applied is 5000 g for 5 minutes. For Example 9, titania is added to the eABS. The titania has a particle size ranging from about 1 micrometer to 12 micrometers with a peak centered at about 8 micrometers. The amount of titania in the eABS is about 1.5% by weight. From the results in Table 5 it is readily apparent that the separation efficiency is substantially improved even at lower g-forces.

Illustration 1

To illustrate the effectiveness of using an adsorption column to remove soluble additives, 1.125 grams of a dye cocktail of equal parts by weight of dyes shown in Table 6 is mixed with 150 grams of SAN and dissolved in 1350 grams of acetone to a test solution. A glass burette was filled with 30 g of activated carbon black (from Chemviron) to form a packed adsorption column. The packed column was rinsed with 60 ml of acetone prior to passing the test solution through the column. 1470 grams of test solution is passed through the column to test removal of dyes with the remaining amount used as a reference. The test solution is black to the eye and has essentially zero transmittance as measured by UV-Vis spectrophotometer. The test solution passed through adsorption column is transparent to the eye and has transmittance of about 85% of visible light.

Example 10

A color mixed ABS sample from toys applications dissolved in acetone (15 wt %) formed dark-opaque sample. It was centrifuged to remove rubber particles and pigments in a like manner as Example 2. The centrifuged solution is less opaque than the solution prior to centrifugation. The centrifuged solution is passed through a like adsorption column in the aforemention illustration resulting in transparent solution.

Examples 11

A waste ABS from electronic equipment having a hindered amine stabilizer (Tinuvin 770) is dissolved in acetone at a concentration of 15% by weight. The solution has a Tinuvin 770 content of 2810 ppm by weight. The solution is centrifuged in a like manner as Example 2, to form a centrifuged solution having a Tinuvin 770 content of 1270 ppm. The centrifuged solution is passed through an adsorption column in the same manner as Example 10. The resulting solution has a Tinuvin concentration of 40 ppm.

TABLE 1

| | | Unit | Example 1 Before | Example 1 After | Example 2 Before | Example 2 After |
|---|---|---|---|---|---|---|
| Content | Acrylonitrile | wt % | 20.7 | 23.5 | 18.1 | 21.5 |
| | Styrene | wt % | 67.1 | 76.3 | 67.7 | 77.7 |
| | Rubber | wt % | 12.2 | 0.2 | 14.2 | 0.3 |
| SAN mol | Mn | kg/mol | 70.4 | 70.2 | 79.0 | 77.9 |
| weight | Mw | kg/mol | 174.2 | 175.5 | 188.0 | 186.6 |
| | Mz | kg/mol | 326.5 | 328.5 | 326.0 | 323.9 |
| | Polydispersity | | 2.5 | 2.5 | 2.4 | 2.4 |

TABLE 2

| Example | Centrifugal force (xg) | Concentration wt % | Chloroform wt % | Rubber wt % |
|---|---|---|---|---|
| Comp. 1 | 0 | 10 | 0 | 14.2 |
| 3 | 13500 | 10 | 0 | 7.0 |
| 4 | 13500 | 10 | 0.5 | 4.5 |
| 5 | 13500 | 10 | 1.0 | 2.5 |
| 6 | 13500 | 10 | 1.5 | 3.8 |

TABLE 3

| Component | Virgin eABS (%) | Recycled eABS (%) |
|---|---|---|
| SAN Virgin | 63.2 | 10 |
| SAN Recycled | 0 | 53.2 |
| GRC | 35.2 | 35.2 |
| Mold release agent | 1.00 | 1.00 |
| Antioxidant package | 0.20 | 0.20 |
| Colorant package | 0.40 | 0.40 |

TABLE 4

| Test | Units | Comp. Ex. 2 | Ex. 7 |
|---|---|---|---|
| MVR (220 C., 10 kg) | $cm^3/10$ min | 36.5 | 24 |
| Falling Dart, Fmax (ISO 6603-2) | MPa | 4115 | 3827 |
| Falling Dart, Ep | J | 27 | 24 |
| Charpy V-notch (ISO 179/1eA) | $kJ/m^2$ | 25 | 29 |
| E-modulus (ISO 527) | MPa | 2109 | 1967 |
| Tensile strength at yield | MPa | 38 | 35 |
| Tensile strength at break | MPa | 30 | 28 |

TABLE 5

| Example | Titania (weight %) | g-force | Separation Efficiency |
|---|---|---|---|
| 8 | None | 5000 | 46% |
| 9 | 1.5 | 5000 | 93% |

TABLE 6

| Raw Material Name | Solubility in Acetone (g/l, 20° C.) |
|---|---|
| Color Disperse Orange 47 - ST | 4 |
| Color Disperse Yellow 201 - ST | 200 |
| Color Disperse Yellow 54 - ST | 0.9 |
| Color Solvent Green 3 - ST | 0.8 |
| Color Solvent Orange 60 - ST | 2 |
| Color Solvent Red 135 - ST | 0.2 |
| Color Solvent Red 179 - ST | 0.5 |
| Color Solvent Red 52 - ST | 1 |

TABLE 6-continued

| Raw Material Name | Solubility in Acetone (g/l, 20° C.) |
|---|---|
| Color Solvent Violet 13 - ST | 1.3 |
| Color Solvent Violet 36 - ST | 6 |
| Color Solvent Yellow 93 - ST | 8 |
| Color Solvent Blue 97 - ST | 3 |
| Color Solvent Yellow 163 - ST | 1.8 |
| Color Solvent Red 195 - ST | 3 |

What is claimed is:

1. A method of recycling a toughened thermoplastic polymer having therein an elastomeric polymer that is present as dispersed elastomer domains comprising, (a) dissolving the thermoplastic polymer of the toughened thermoplastic polymer in a solvent to form a solution, forming elastomeric polymer particles or droplets from the elastomeric polymer and suspending the elastomeric polymer particles or droplets in the solution, wherein there is a density difference of at least about 2% between density of the solution and density of the elastomer particles or droplets in the solution;

(b) applying a centrifugal force to the solution to separate the elastomeric polymer particles or droplets from the solution to form a separated system; and (c) recovering the thermoplastic polymer and elastomeric polymer by removing one or both from the separated system.

2. The method of claim 1, wherein an inorganic particulate that is insoluble in the solvent is added to the thermoplastic polymer, prior to or during the dissolving of the thermoplastic polymer.

3. The method of claim 2, wherein the inorganic particulate has an average size that is larger than the elastomer droplets or particulates average size.

4. The method of claim 3, wherein the inorganic particulate average size is at least 5 time greater than the elastomer droplets or particulates average size.

5. The method of claim 1, wherein the density difference is at least about 5%.

6. The method of claim 1, wherein the density of the solution is less than the density of the elastomeric polymer particles or droplets in the solution.

7. The method of claim 1, wherein the solvent has a density that is at least 10% lower than density of the thermoplastic polymer.

8. A method of recycling a toughened thermoplastic polymer having therein an elastomeric polymer that is present as dispersed elastomeric polymer domains comprising:

(a) dissolving thermoplastic polymer of the toughened thermoplastic polymer in a solvent to form a solution, forming elastomeric polymer particles or droplets from the elastomeric polymer and suspending the elastomeric polymer particles or droplets in the solution, wherein there is a density difference between density of the solution and density of the elastomeric polymer particles or droplets;

(b) introducing a second solvent that swells or dissolves the elastomeric particles;

(c) applying a centrifugal force to the solution to separate the elastomeric polymer particles or droplets from the solution to form a separated system; and (d) recovering the thermoplastic polymer and elastomeric polymer by removing one or both from the separated system.

9. The method of claim 8, wherein the second solvent increases the density of said swelled or dissolved particles.

10. The method of claim 8, wherein the solvent comprised of a first solvent and the second solvent has a density of at most about 0.9 g/ml.

11. The method of claim 10, wherein the second solvent has a density of at least 1.2 g/cc.

12. The method of claim 10 wherein the second solvent causes the density difference to increase.

13. The method of claim 11, wherein the second solvent is a halohydrocarbon.

14. The method of claim 11, wherein greater than 0 to about 1.5 wt % of the second solvent is introduced.

15. The method of claim 8, wherein an inorganic particulate that is insoluble in the solvent is added to the thermoplastic polymer, prior to or during the dissolving of the thermoplastic polymer.

16. A method of recycling a toughened thermoplastic polymer having therein an elastomeric polymer that is present as dispersed elastomeric polymer domains comprising:

(a) dissolving thermoplastic polymer of the toughened thermoplastic polymer in a solvent to form a solution, forming elastomeric polymer particles or droplets from the elastomeric polymer and suspending the elastomeric polymer particles or droplets in the solution, wherein there is a density difference between density of the solution and density of the elastomeric polymer particles or droplets, wherein the solvent has a density of at most about 0.9 g/cc;

(b) applying a centrifugal force to the solution to separate the elastomeric polymer particles or droplets from the solution to form a separated system,; and (c) recovering the thermoplastic polymer and elastomeric polymer by removing one or both from the separated system.

17. The method of claim 16, wherein the solvent is comprised of at least 2 solvents, and each solvent has a density of less than 0.9 g/cc.

18. The method of claim 17, wherein each of the at least 2 solvents have the density of less than 0.85 g/cc.

19. The method of claim 16, wherein an inorganic particulate that is insoluble in the solvent is added to the thermoplastic polymer, prior to or during the dissolving of the thermoplastic polymer.

20. The method of claim 18, wherein the density difference is at least 5%.

* * * * *